United States Patent [19]

Miller

[11] Patent Number: 5,060,286
[45] Date of Patent: Oct. 22, 1991

[54] RASTER ROW AND BYTE GROUP GRAPHICS IMAGES DATA COMPRESSION METHOD

[75] Inventor: Steven O. Miller, Vancouver, Wash.

[73] Assignee: Hewlett-Packard Company, Palo Alto, Calif.

[21] Appl. No.: 299,363

[22] Filed: Jan. 19, 1989

[51] Int. Cl.⁵ ............................................. G06K 9/36
[52] U.S. Cl. ........................................ 382/56; 382/55
[58] Field of Search .................. 382/56, 47, 55, 54; 358/284, 261.1, 261.2, 262.1; 364/200, 600, 601

[56] References Cited

U.S. PATENT DOCUMENTS

| | | | |
|---|---|---|---|
| 4,757,352 | 7/1988 | Asano et al. | 382/56 |
| 4,791,680 | 12/1988 | Yokoe et al. | 382/56 |
| 4,809,350 | 2/1989 | Shimoni et al. | 382/56 |
| 4,825,285 | 4/1989 | Speidel et al. | 382/56 |
| 4,932,066 | 6/1990 | Nakayama et al. | 382/56 |
| 4,947,448 | 8/1990 | Nakayama et al. | 382/56 |

*Primary Examiner*—Michael Razavi

[57] ABSTRACT

The invented graphics images data compression method includes software which selectively compresses data on a raster-row-by-raster-row basis or on a byte-group-by-byte-group basis. The raster-row-by-raster-row basis compares bytes within adjacent raster rows and thereby detects repetitions between the rows. When data is compared on a raster-row-by-raster-row basis, the invented method records any differences as relative offset and replacement bytes. The byte-group-by-byte-group basis compares different byte groups within a single raster row, and thereby detects repetitions within the row itself.

6 Claims, 4 Drawing Sheets

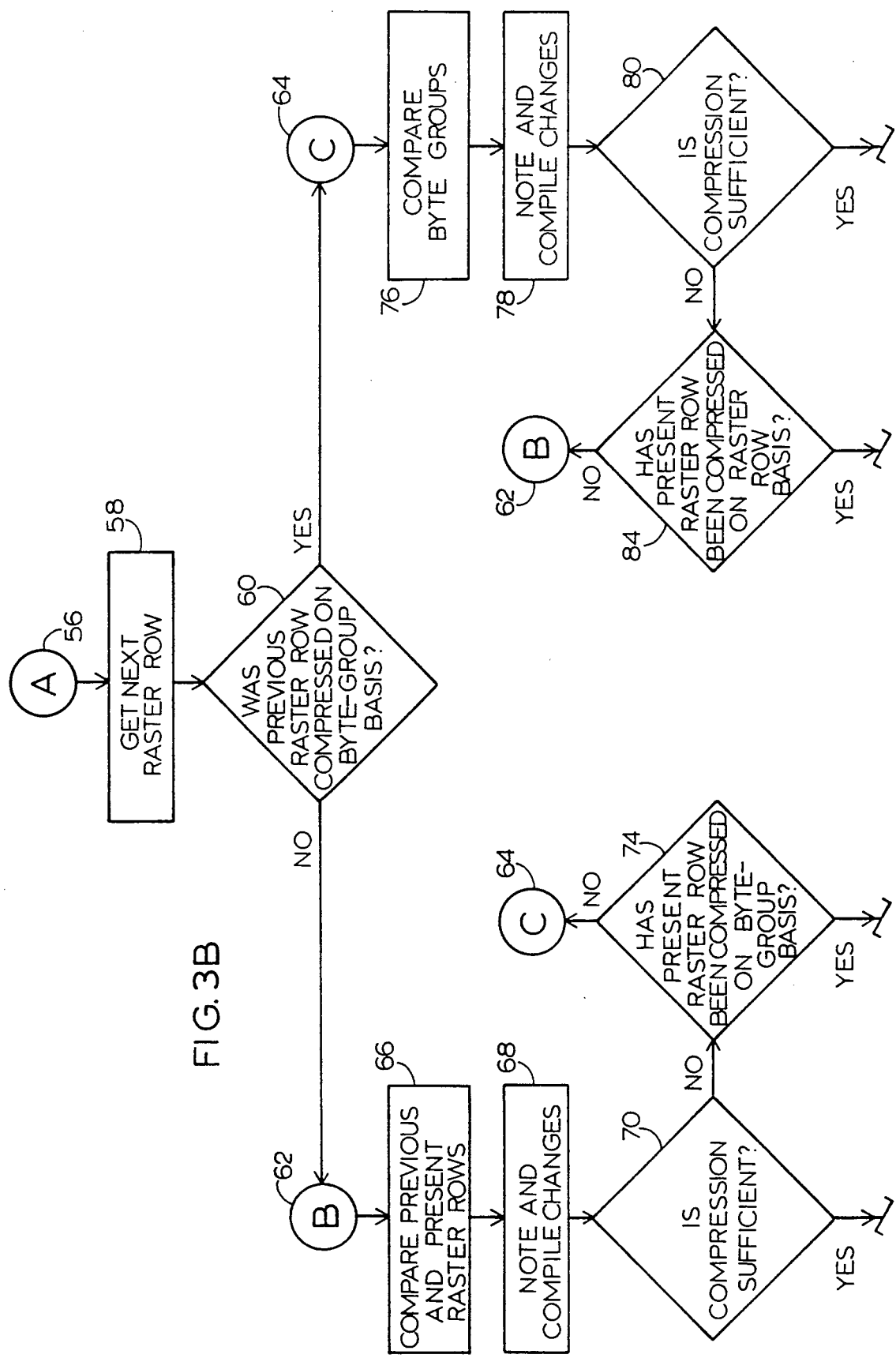

RASTER ROW AND BYTE GROUP GRAPHICS IMAGES DATA COMPRESSION METHOD

TECHNICAL FIELD

This invention relates to a method of graphics data compression and, more particularly, to software capable of compressing, selectively, data on a raster-row-by-raster-row basis or on a byte-group-by-byte-group basis.

BACKGROUND ART

Bytes of data often describe graphics images as an arrangement of raster rows. A raster row is one line or strip of a graphics image. Numerous parallel raster rows may be arranged or stacked to produce an entire graphics image.

Each byte of data describes a part of a raster row within the graphics image. Because each byte describes a part of a raster row, the data itself may be referred to as a raster row of data, or data arranged on a raster-row-by-raster-row basis, as is done in the following text.

Because graphics images are often complex, the data describing the images may be extensive and detailed. Accordingly, transferring such data between components in a system, such as between a host computer and a printer, often requires a large amount of memory and may result in an undesirable time lag. To limit the required memory and to prevent such time lags, the data may be compressed so that information is transferred by employing less data, with time thereby saved.

Data may be compressed in a variety of ways. For example, Gilbert Held, in his book *Data Compression*, published by Wiley Hayden, copyright 1984, discloses a compression method wherein bits of data within one raster row are compared with bits of data in an adjacent raster row. By comparing the bits, the differences between the rows may be noted. Once noted, one raster row may be described by stating how the bits in that row differ from the bits in the other row. The data describing the differences may be less extensive than the data describing the raster row, resulting in a compression of data.

However, comparing different raster rows of data on such a bit-by-bit basis does not recognize repetitious data within the raster rows themselves. Additionally, such a comparison does not lend itself to a concise method of recording the bit changes between the rows.

The method of the present invention overcomes the limitations of such prior data compression methods by recognizing repetitions within raster rows as well as by providing a concise method of recording changes between rows.

DISCLOSURE OF THE INVENTION

The invented graphics images data compression method includes software which selectively compresses data on a raster-row-by-raster-row basis or on a byte-group-by-byte-group basis. The raster-row-by-raster-row basis compares bytes within adjacent raster rows and thereby detects repetitions between the rows. When data is compared on a raster-row-by-raster-row basis, the invented method records any differences as relative offset and replacement bytes. The byte-group-by-byte-group basis compares different byte groups within a single raster row, and thereby detects repetitions within the row itself. Selectively compressing data according to such bases results in superior data compression.

BRIEF DESCRIPTION OF THE DRAWINGS

FIGS. 3A–C constitute a detailed block diagram showing the invented data compression method.

DETAILED DESCRIPTION AND BEST MODE FOR CARRYING OUT THE INVENTION

Figure 1:
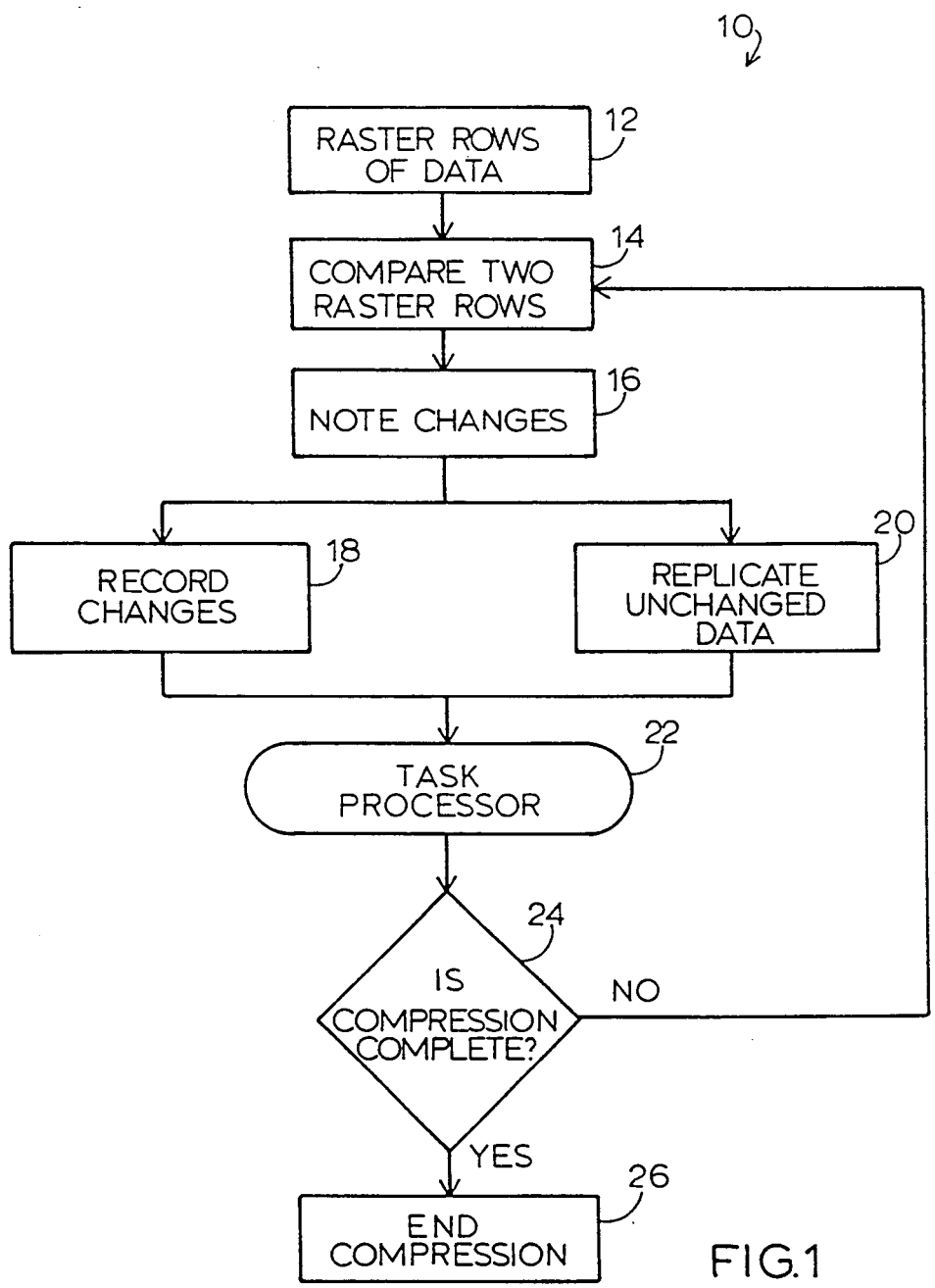
FIG. 1 is a block diagram showing the invented raster-row-by-raster-row compression method.

FIG. 1 shows generally at 10 a block diagram of the invented raster row data compression method. Initially, a block of data is arranged on a raster-row-by-raster-row basis, as signified by block 12. Again, a block of data arranged on a raster-row-by-raster-row basis refers to data which describes an image as an arrangement of raster rows.

Step 14 then compares first and second raster rows of data and the changes between the rows are noted at step 16. Specifically, each byte in the second raster row that differs from the corresponding byte in the first raster row is recorded, at step 18, as relative offset and replacement bytes. Corresponding bytes are bytes of data that define parts of an image which are vertically adjacent but in different raster rows. Relative offset and replacement bytes refer to a manner of recording the changes between such raster rows.

For example, the number of bytes to be replaced in a second raster row because they differ from the corresponding bytes in the first raster row, may be recorded as a three-bit number. The location of the bytes to be replaced may be recorded as a five-bit number. The five-bit number is the relative offset value. The offset is the number of bytes in the present raster row from the last untreated byte, or in other words, the number of bytes from the byte following the last replaced byte. Alternatively, the offset may be relative to the left graphics margin.

An offset that is large may require several bytes to represent. The numbers zero through thirty may signify a relative offset of zero to thirty where zero refers to the next uncompressed byte. If the five-bit number is thirty-one, then the next byte is interpreted as an additional offset value and is added to the previous five-bit number. For example, an offset of thirty-one may be recorded as the number thirty-one plus an additional offset of zero contained in the next byte of data. Thirty-two may be recorded as the number thirty-one plus an additional offset of one. If such next byte contains the number two hundred fifty-five, then such value is added to the five-bit number and the next byte is included as an offset, and so on.

As explained, the number of bytes to replace and the location (offset) of such bytes are recorded. The replacement bytes themselves follow the bytes defining the offset value. For each byte that is replaced, a replacement byte must follow. The number of replacement bytes may range from one to eight, but may not exceed eight for a single command byte because only three binary digits are available to indicate the number of bytes to replace. Accordingly, the format of such data may be expressed as:

<command byte> [<optional offset bytes>]<replacement bytes> where the command byte includes the three-bit number of bytes to replace and the initial five-bit offset value. For example, in binary code, if the command byte is "0100 0000", then the next three bytes in the present raster row are to be replaced with whatever replacement bytes follow. If the command byte is "0110 0101", then the next five bytes in the present raster row are jumped over and the following four bytes are replaced with the appropriate four replacement bytes. If the command byte is "0000 0000", the next byte is to be replaced.

In the preferred embodiment, compiling changes between raster rows or byte groups refers to recording the number and location of such changes as explained. However, different recording methods may be used without departing from the invented compression method.

Data that does not change between the compared raster rows is replicated at step 20. The replicated bytes are not part of the compressed data because they would already exist in a task processor's memory or buffer. In other words, the step of replicating simply leaves data unchanged. The replicated bytes and the relative offset and replacement bytes completely describe the data within the second raster row. The data may then be sent to a task processor as symbolized by step 22. Again, only the offset and replacement bytes are sent to the task processor because the replicated data is already there and remains unchanged. Step 24 then determines whether the entire block of data has been compressed. If so, step 26 ends the compression. If not, the method recommences at step 14 by comparing subsequent raster rows of information.

Initially, first and second raster rows were compared. Comparing data describing subsequent raster rows means that what was previously referred to as the "second" raster row is now the "first" raster row. In other words, "first" raster row, as used herein, means the reference or seed row. A next raster row becomes the second raster row, and is compared to the uncompressed data which describes the new first raster row. Accordingly, the terms first and second raster rows refer to different rows as the compression progresses.

Figure 2:
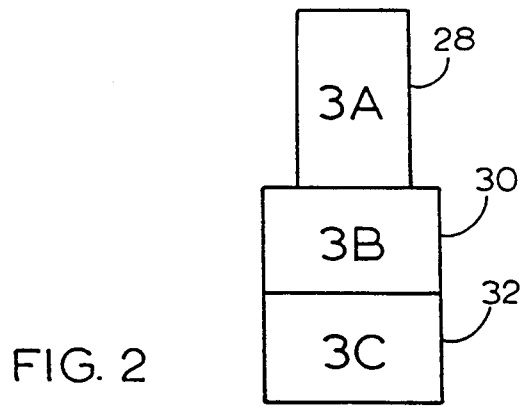
FIG. 2 depicts the relationship of FIGS. 3A, 3B, 3C.
Figure 3A:
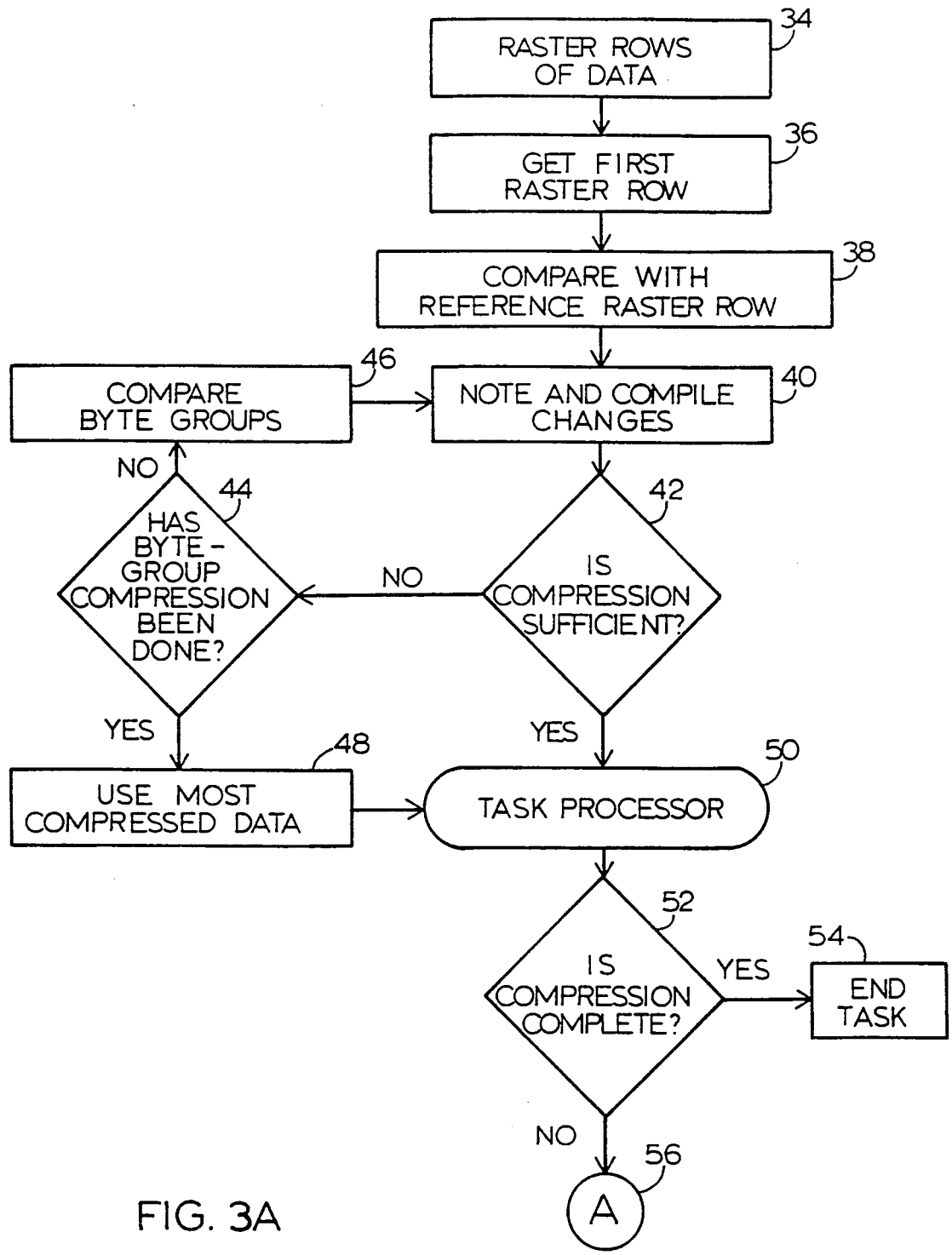
Figure 3C:
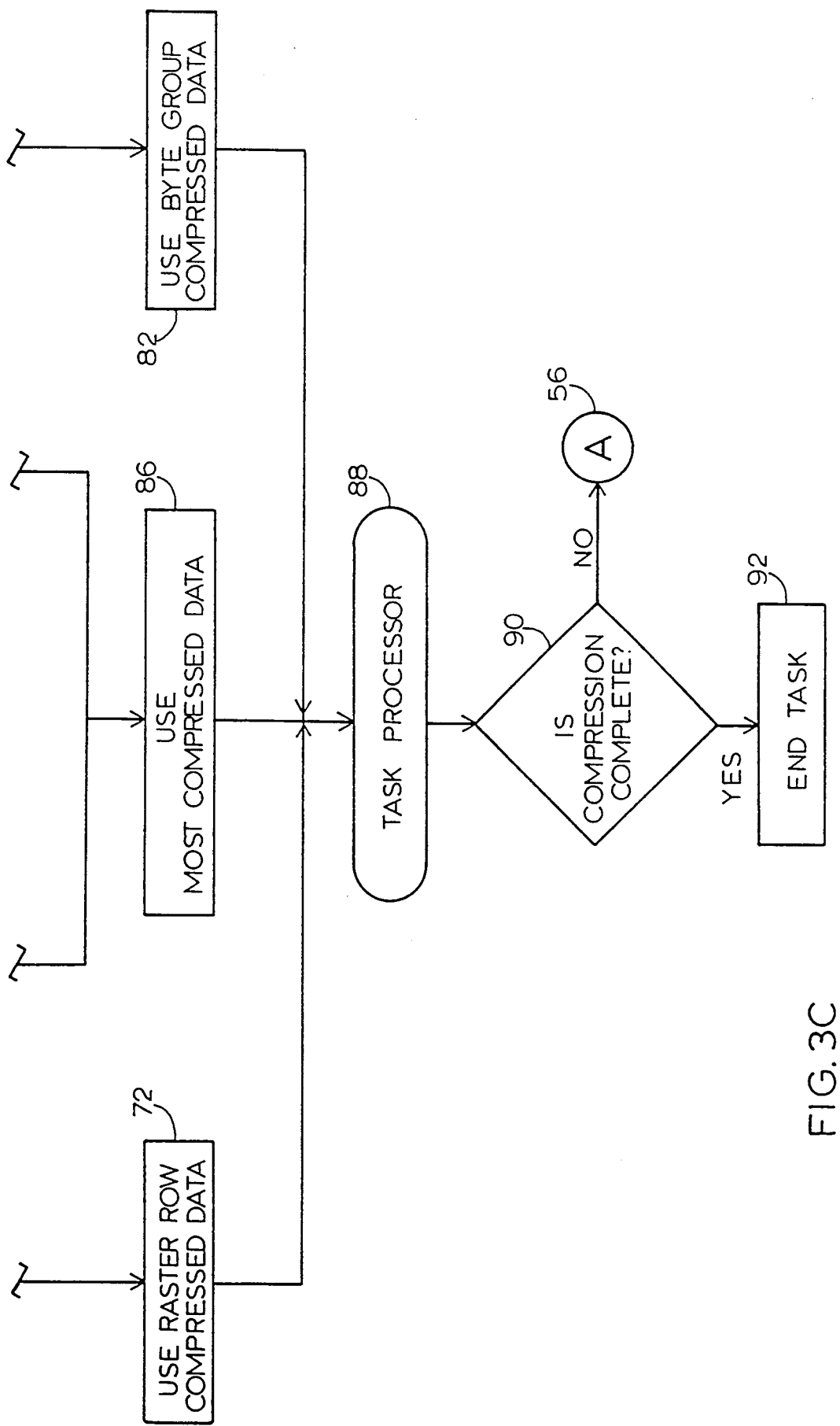

FIG. 2 depicts the relationship between FIGS. 3A–C, wherein FIG. 3A is depicted by block 28, FIG. 3B by block 30 and FIG. 3C by block 32. FIGS. 3A, 3B and 3C show a block diagram of the invented selectable compression method.

In FIG. 3A, block 34 represents bytes of data describing raster rows of an image. Step 36 identifies the first raster row of such data.

The first raster row at the beginning of compression activity is then compared with a reference raster row as shown at step 38. The reference raster row is generated by the system employing the invented method, and would typically be set to a value of zero because the initial rows of a graphics image are generally blank.

The next step 40 is to note and compile the changes between the first raster row and the reference raster row. The compilation of such changes constitutes a compressed description of the data describing the first raster row. Step 42 then determines whether the compression was sufficient. A compression is sufficient if it meets a preselected compression ratio, for example 9:1.

If the compression is not sufficient, then the invented method determines, at step 44, whether the bytes of data within the first raster row have been compressed on a byte-group-by-byte-group basis. If a byte-group compression has not been done, then the method compares byte groups within the first raster row, as shown at step 46. A byte group is a preselected number of bytes within a given raster row. Steps 40 and 42 are then repeated for the byte-group compression.

If the raster row compression was insufficient, and the byte-group compression was also insufficient, then the invented method uses the most compressed data, as shown by step 48. The most compressed data may be the raster row compression, the byte-group compression or the uncompressed data itself, whichever requires less memory to store.

If either the initial raster row compression was sufficient, the subsequent byte-group compression was sufficient or if the most compressed data has been selected for use, the next step 50 is to convey any such data to the task processor. The invented method then determines at step 52 whether the compression is complete. If so, the task is ended at step 54. If not, the method proceeds with the steps labeled "A" at 56.

FIG. 3B depicts the steps following the label "A". Initially, the method identifies the next raster row at step 58. That row is then compressed on the same basis as was the previous raster row. For example, if the previous raster row was compressed on a byte-group-by-byte-group basis, the next raster row will also be compressed on a byte-group-by-byte-group basis. Step 60 determines what the previous basis of compression was. If the previous raster row was uncompressed, then either compression method may be selected.

If the previous compression was on a raster-row-by-raster-row basis, the invented method proceeds through the steps labeled "B" at 62. If the previous compression was on a byte-group-by-byte-group basis, the invented method proceeds with the steps labeled "C" at 64.

The steps identified by label "B" begin by comparing the present raster row with the previous raster row, as shown by step 66. The changes between the rows are noted and compiled at step 68. The method then determines, at step 70, whether the compression was sufficient. If so, the data resulting from the raster row compression is used as shown in FIG. 3C at step 72.

If step 70 determines that there was not a sufficient compression, then the next step is to determine whether the raster row has been compressed on a byte-group-by-byte-group basis, as shown at 74. If not, the method proceeds to those steps following label "C" at 64.

Accordingly, the steps following label "C" will be performed if the previous raster row was compressed on a byte-group-by-byte-group basis, as determined in step 60, or if the raster row compression of steps 66, 68 did not result in a sufficient compression. In either case, byte groups are compared at 76. The changes between byte groups are noted and compiled at 78.

The method then determines, at step 80, whether the byte-group compression was sufficient. If so, the data compressed on the byte-group-by-byte-group basis will be used, as shown in FIG. 3C at step 82. If the byte-group compression did not result in a sufficient compression, the method determines whether the data has been compressed on a raster-row-by-raster-row basis, as shown in step 84. If not, then the method continues with the steps following label "B" at 62.

FIG. 3C further depicts the invented data compression method. If a raster row has been compressed on a raster-row-by-raster-row basis and a byte-group-by-byte-group basis, and neither compression resulted in a sufficient compression, then the method will advance to block 86 and use the most compressed data. The most compressed data may be either the raster row compressed data, the byte-group compressed data or the uncompressed data.

Whichever data is used, it is conveyed to task processor at step 88. The method then determines, at step 90, whether the data compression is complete, and if so the task is ended, as shown in block 92. If the compression is not complete, the method returns to label "A" at 56 in FIG. 3B and proceeds with the subsequent steps.

INDUSTRIAL APPLICABILITY

The raster row data compression method and the selectable data compression method are applicable to any data describing graphics images on a raster-row-by-raster-row basis. Compressing data by comparing raster rows has a high compression ratio on data that is repetitive from raster row to raster row, or in the "vertical" direction. Byte-group data compression has a high compression ratio for data that is repetitive within a single raster row, or in the "horizontal" direction.

The selectable data compression method allows for data to be compressed on either a raster row or a byte-group basis, depending on which method of compression produces sufficient results. Such a selective compression method results in superior performance compared to other data compression methods because graphics images are often repetitive in a horizontal or vertical direction, but not always in both directions at the same time.

While the preferred embodiment or best mode of the invention has been described herein, variations and changes may be made without departing from the spirit of the invention.

What is claimed is:

1. A computer-implemented method used in a system, wherein byte groups of data are arranged on a raster-row-by-raster-row basis, for compressing such data comprising:
    comparing raster rows of data on a raster-row-by-raster-row adjacency basis, including comparing a first raster row and a second raster row;
    noting the changes between the compared rows, including recording the number and location of bytes in the second raster row that differ from corresponding bytes in the first raster row;
    compiling such changes so that they constitute a first compressed description of at least one of the compared rows, including both supplying replacement bytes for bytes in the second raster row that differ from the corresponding bytes in the first raster row, and using the recorded number and location with the replacement bytes to constitute a compressed description of the second raster row;
    determining whether such first compressed description results in a predetermined rate of compression of the data;
    if so, using the first compressed description;
    if not, comparing the data on a byte-group-by-byte-group adjacency basis;
    noting the changes between the compared byte groups;
    compiling such changes so that they constitute a second compressed description of at least one of the compared byte groups;
    determining whether such second compressed description results in a predetermined rate of compression of the data;
    is of, using the second compressed description;
    it not, using the most compressed description between the first and second compressed descriptions and the uncompressed data; and
    repeating the above-disclosed steps for subsequent raster rows of data.

2. The method of claim 1, wherein the step of comparing the data on a byte-group-by-byte-group adjacency basis, comprises comparing a first group of a predetermined number of bytes of data with a second group of a predetermined number of bytes of data within the same raster row, and repeating such comparison of bytes until all the bytes comprising the raster row have been compared.

3. The method of claim 2, wherein the first and second groups are each one byte.

4. A computer-implemented method used in a system, wherein byte groups of data re arranged on a raster-row-by-raster-row basis, for compressing such data comprising:
    comparing such raster rows of data on a byte-group-by-byte-group adjacency basis, including comparing a first raster row and a second raster row;
    noting the changes between compared byte groups, including recording the number and location of bytes in the second raster row that differ from corresponding bytes in the first raster row;
    compiling such changes so that they constitute a first compressed description of at least one of the compared byte groups, including both supplying replacement bytes in the second raster row that differ from the corresponding bytes in the first raster row, and using the recorded number and location with the replacement bytes to constitute a compressed description of the second raster row;
    determining whether such first compressed description results in a predetermined rate of compression of the data;
    if so, using the first compressed description;
    if not, comparing the data on a raster-row-by-raster-row adjacency basis;
    noting the changes between the compared rows;
    compiling such changes so that they constitute a second compressed description of at least one of the compared rows;
    determining whether such second compressed description results in a predetermined rate of compression of the data;
    if so, using the second compressed description;
    if not, using the most compressed description between the first and second compressed descriptions and the uncompressed data; and
    repeating the above-disclosed steps for subsequent raster rows of data.

5. The method of claim 4, wherein the step of comparing the data on a byte-group-by-byte-group adjacency basis, comprises comparing a first group of a predetermined number of bytes of data with a second group of a predetermined number of bytes of data within the same raster row, and repeating such comparison of bytes until all the bytes comprising the raster row have been compared.

6. The method of claim 5, wherein the first and second groups are each one byte.

* * * * *